(12) United States Patent
Hua et al.

(10) Patent No.: US 8,965,272 B2
(45) Date of Patent: Feb. 24, 2015

(54) SYSTEM AND METHOD FOR PROVIDING REOCCURRENCE DISPLAY OF COMMERCIAL MOBILE ALERT MESSAGES

(75) Inventors: Suzann Hua, Lisle, IL (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 310 days.

(21) Appl. No.: 13/532,886

(22) Filed: Jun. 26, 2012

(65) Prior Publication Data

US 2013/0344800 A1   Dec. 26, 2013

(51) Int. Cl.
*H04H 40/00* (2008.01)

(52) U.S. Cl.
USPC ............. 455/3.06; 455/404.1; 455/412.1

(58) Field of Classification Search
USPC ............ 455/3.06, 404.1, 412.1, 412.2
See application file for complete search history.

(56) References Cited

U.S. PATENT DOCUMENTS 5,628,050 A * 5/1997 McGraw et al. ............. 455/12.1
2006/0094410 A1   5/2006 Cortegiano
2009/0291670 A1   11/2009 Sennett
2011/0081882 A1   4/2011 Daly
2011/0154391 A1 * 6/2011 Velazquez et al. ............. 725/33

OTHER PUBLICATIONS

PCT/US2013/046530 Notification of Transmittal of The International Search Report and The Written Opinion of The International Searching Authority, or The Declaration dated Oct. 17, 2013.
3GPP: "3rd Generation Partnership Project; Technical Specification Group Services and Systems Aspects; Public Warning System (PWS) Requirements (Release 12)", 3GPP TS 22.268 (Sep. 2012); 3rd Generation Partnership Project (3GPP), Cedex, France.

* cited by examiner

*Primary Examiner* — Nhan Le
(74) *Attorney, Agent, or Firm* — S. R. Santema

(57) ABSTRACT

A commercial mobile alert message (e.g., without limitation, a WRITE-REPLACE message), delivered by a CMSP to one or more targeted mobile devices, specifies one or more reoccurrence display parameters adapted to invoke multiple reoccurrent displays of the CMAM by targeted mobile devices. The reoccurrence display parameters may comprise, for example, a mandatory or optional advisory; a number of displays condition; a time interval between consecutive displays condition; and a compliance time interval condition.

14 Claims, 4 Drawing Sheets

SYSTEM AND METHOD FOR PROVIDING REOCCURRENCE DISPLAY OF COMMERCIAL MOBILE ALERT MESSAGES

FIELD OF THE INVENTION

This invention relates generally to wireless telecommunication systems and, more particularly, to providing public safety alerts and other alert notifications to mobile units in an indicated alert area.

BACKGROUND OF THE INVENTION

A variety of alert notification systems are known for providing weather alerts and other alerts, such as police, fire and emergency alerts to the public. Typically, the alert notification is generated from a public authority (e.g., community, state or national authority) and is targeted to the public located within an indicated geographic area. Historically, alert notifications have been delivered by modalities such as warning sirens and warning tones broadcast over radio and television channels. In recent years, a need has been recognized to extend alert notification systems to wireless telecommunication systems, so as to deliver public safety and other alert notifications to mobile units operated by wireless subscribers present within an indicated geographic area.

Current practices and standards for mobile alert messages are set forth in the following documents, each of which is fully incorporated herein by reference:

"Commercial Mobile Alert Service Architecture and Requirements," Version 1.0, dated Oct. 12, 2007 (describing general requirements of a United States Commercial Mobile Alert Service);

Third Generation Partnership Project (3GPP) technical specification TS 22.268 version 11.3.0, dated December 2011 (describing general requirements for a Public Warning System (PWS) in a 3GPP communication network);

3GPP TS 25.419, dated September 2011 (describing parameters of a Service Area Broadcast Protocol (SABP) in a 3GPP communication network);

3GPP TS 48.049, dated March 2012 (describing parameters of a Cell Broadcast Service Protocol (CBSP) in a 3GPP communication network);

ETSI TS 102 900, version 1.2.1, dated January 2012 (describing general requirements of a European Public Warning Service).

Generally, in accordance with the foregoing documents, a Commercial Mobile Service Provider (CMSP) receives an alert message from an alerting entity (e.g., an alert initiator, gateway or aggregator). The CMSP formats the alert in a manner consistent with the appropriate delivery protocol (e.g., SABP, CBSP) and delivers it via one or more cell sites/paging transceivers (e.g., depending on delivery protocol, radio network controllers (RNCs) or base station controllers (BSCs)) to targeted mobile devices. The alert may be delivered to all or a subset of the CMSP's coverage area and/or all or a subset of mobile devices supported by the service provider.

Current practices and standards allow for repetitive rebroadcast of mobile alerts by the RNC/BSCs serving the affected mobile devices so as to increase the likelihood that mobile users will receive and display the alert. In particular, according to current practices and standards, a broadcast commercial mobile alert message (e.g., a WRITE-REPLACE message in the SABP/CBSP protocols), delivered by a CMSP to one or more RNC/BNCs, includes a "number of broadcasts requested" and a "repetition period" parameter so as to instruct the RNC/BNCs as to how many times and how often they are to rebroadcast the message. However, the current practice of repetitive rebroadcast of mobile alerts can create network congestion and may adversely affect performance of the CMSP network resources. Accordingly, it is desirable to provide for reoccurrent mobile alerts at the mobile unit in a manner that reduces or eliminates repetitive rebroadcasts from the RNC/BNCs.

SUMMARY OF THE INVENTION

These problems are addressed and a technical advance is achieved in the art by a feature whereby new parameters in a commercial mobile alert message (e.g., without limitation, a WRITE-REPLACE message), delivered by a CMSP to one or more RNC/BNCs and passed to targeted mobile devices, provide for the mobile devices to display reocurrent mobile alerts without relying on repetitive rebroadcasts from the RNC/BNCs.

In one embodiment, a CMSP gateway node receives a CMAM (Commercial Mobile Alert Message) from an alerting authority; selects one or more reoccurrence display parameters adapted to invoke multiple reoccurrent displays of the CMAM by targeted mobile devices; augments the CMAM with indicia of the selected reoccurrence display parameters, and delivers the augmented CMAM to the targeted mobile devices. Optionally, the augmented CMAM may comprise an amended or appended WRITE-REPLACE message, or a counterpart message including indicia of the selected reoccurrence display parameters.

In another embodiment, a mobile device receives a CMAM (e.g., an augmented CMAM from a CMSP gateway node) with indicia of reoccurrence display parameters, and displays the CMAM in compliance with the reoccurrence display parameters. The reoccurrence display parameters may comprise, for example, a mandatory or optional advisory; a number of displays condition; a time interval between consecutive displays condition; and a compliance time interval condition.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

For ease of reference, the detailed description is divided as follows. Section I provides an overview of a Commercial Mobile Alert Service. Section II describes a solution for achieving reoccurrent mobile alerts at target mobile devices without relying on repetitive rebroadcasts from the RNC/BNCs.

I. Overview of a Commercial Mobile Alert Service (CMAS).

Figure 1:
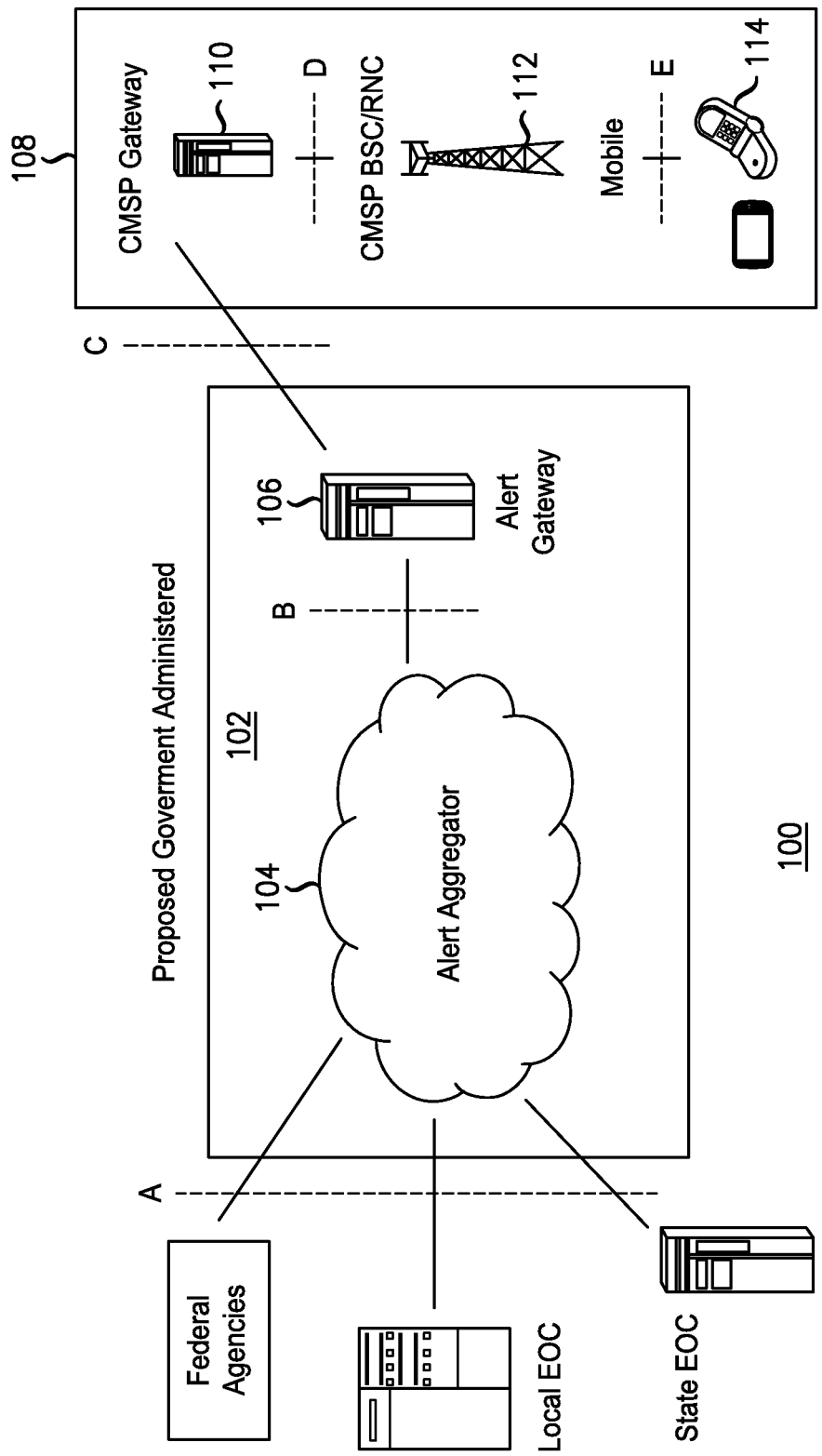
FIG. 1 is a functional reference model of a Commercial Mobile Alert Service in which embodiments of the present invention may be implemented.

FIG. 1 is a functional reference model of a CMAS system 100 as set forth in the above-referenced "Commercial Mobile Alert Service Architecture and Requirements" document for the distribution of mobile alerts to mobile units operating within the coverage area of a Commercial Mobile Service Provider (CMSP).

Under this exemplary model, a Federal Government entity, a Government Alerting Network 102 includes an "Alert Aggregator" 104 and an "Alert Gateway" 106. The Alert Aggregator 104 receives, aggregates and authenticates alerts originated by one or more alert initiators (as shown, federal agencies, local and state Emergency Operations Centers (EOCs)) and transmitted across reference point "A." The alerts may comprise, for example, new, updated or canceled Commercial Mobile Alerts (CMAs) comprising, for example, Presidential-level; Imminent threat to life and property; and Child Abduction Emergency or "AMBER" alerts. The Alert Aggregator 104 forwards the alerts to the Alert Gateway 106 across reference point "B." The Alert Gateway 106 may reformat the alerts, if necessary (e.g., to conform with supported technologies, service profile or the like) and delivers the alerts across reference point "C" to a Commercial Mobile Service Provider (CMSP) Network 108.

The CMSP Network 108 includes a CMSP gateway 110 and one or more cell sites/paging transceivers 112 (e.g., depending on delivery protocol, radio network controllers (RNCs) or base station controllers (BSCs)). Upon receiving the alert, the CMSP gateway 110 formats the alert in a manner consistent with the appropriate delivery protocol (e.g., SABP, CBSP) and sends it to one or more of the cell sites/paging transceivers 112 across reference point "D." The RNCs/BSCs then broadcast the alert to targeted mobile devices 114 across reference point "E." Ultimately, the alert is delivered to targeted mobile devices "in whole or in part," including all or a subset of the CMSP's coverage area and/or all or a subset of mobile devices supported by the service provider.

Figure 2:
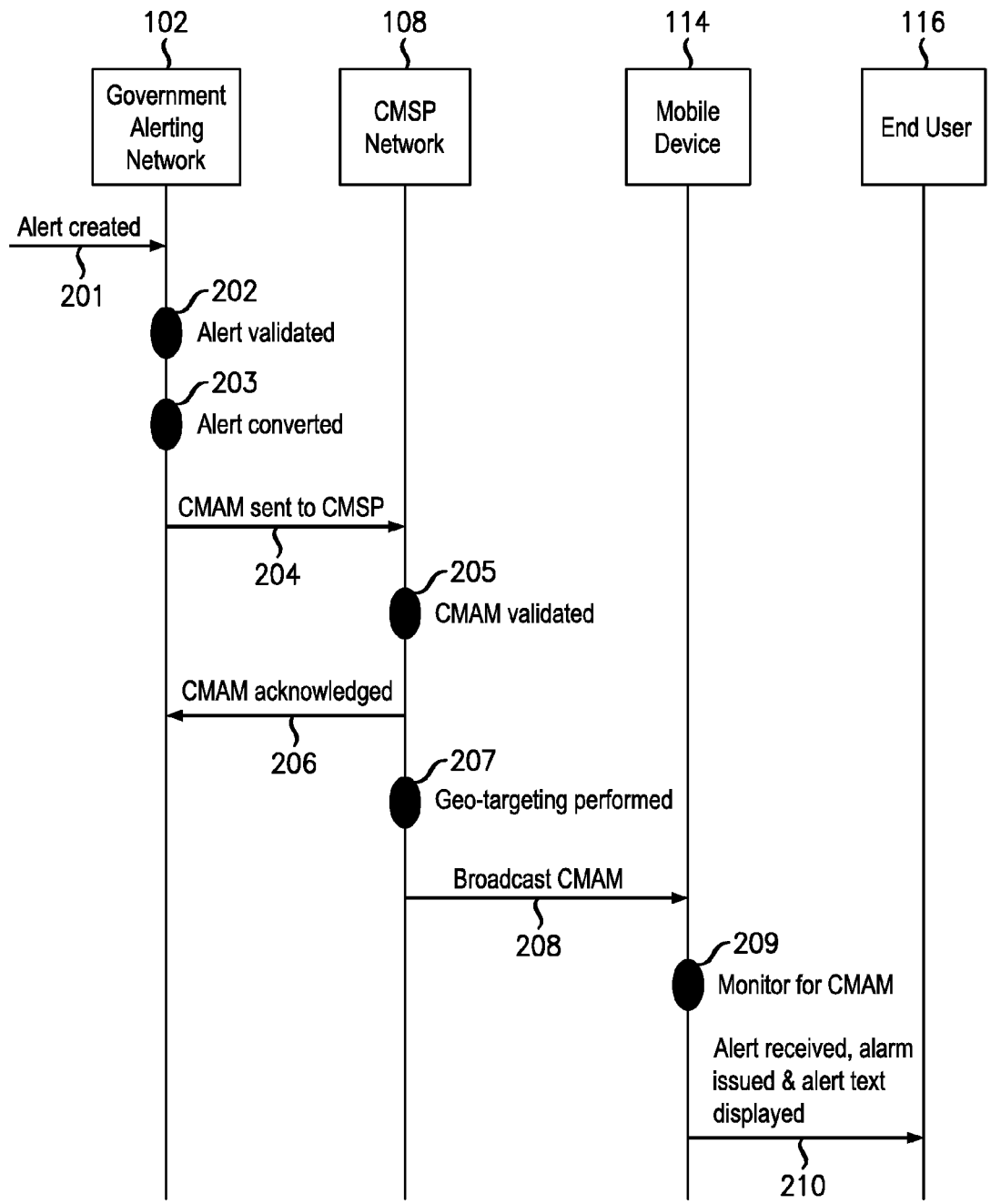
FIG. 2 shows a nominal message sequence for a text-based Commercial Mobile Alert Message (CMAM) according to current practices and standards.

FIG. 2 shows a nominal message sequence for a text-based Commercial Mobile Alert Message (CMAM) delivered via the above-described CMAS system 100 according to current practices and standards. In particular, FIG. 2 depicts a message sequence between the Government Alerting Network 102, CMSP Network 108, Mobile Device 114 and end user 116 (not shown in FIG. 1). FIG. 2 corresponds generally to FIG. 4-1 of the above-referenced "Commercial Mobile Alert Service Architecture and Requirements" document.

The message sequence of FIG. 2 includes the following steps:

At step 201, an alert is created and sent to the Government Alerting Network 102 over reference point "A."

At step 202, the Government Alerting Network 102 validates and authenticates the received alert request.

At step 203, the Government Alerting Network 102 converts the received alert message into the text profile based CMAS format supported by the CMSP.

At step 204, the Government Alerting Network 102 sends the text profile based CMAM to the CMSP over reference point C.

At step 205, the CMSP validates the received CMAM.

At step 206, the CMSP sends an acknowledgement to the Government Alerting Network 102 that a valid CMAM has been received.

At step 207, the CMSP performs geo-targeting to translate the indicated alert area into the associated set of cell sites/paging tranceivers for broadcast of the CMA.

At step 208, the CMSP broadcasts the CMAM to the set of cell sites/paging transceivers identified by the geo-targeting process of step 207. The CMAM is broadcast from the cell sites/paging transceivers to targeted mobile devices via a CMSP selected technology.

At step 209, mobile devices 114 monitor for the broadcast of the CMAM via the CMSP selected technology.

At step 210, the CMAM is received and presented to the end user 116 according to the capabilities of the mobile device 114. In one scenario, the CMAM is presented with a CMAS audio attention signal and/or a special emergency alert vibration cadence (if mobile device has vibration capabilities) and the CMAM message text is displayed on a visual display of the mobile device.

II. Problem Statement and Solution

As has been noted, current practices and standards allow for repetitive rebroadcast of mobile alerts by the RNC/BSCs serving targeted mobile devices so as to increase the likelihood that mobile users will receive and display the alert. Thus, at step 208, a broadcast commercial mobile alert message (e.g., a WRITE-REPLACE message in the SABP/CBSP protocols), delivered by a CMSP to one or more RNC/BNCs, includes a "number of broadcasts requested" and a "repetition period" parameter so as to instruct the RNC/BNCs as to how many times and how often they are to rebroadcast the message. However, the current practice of repetitive rebroadcast of mobile alerts can create network congestion and may adversely affect performance of the CMSP network resources.

Figure 3:
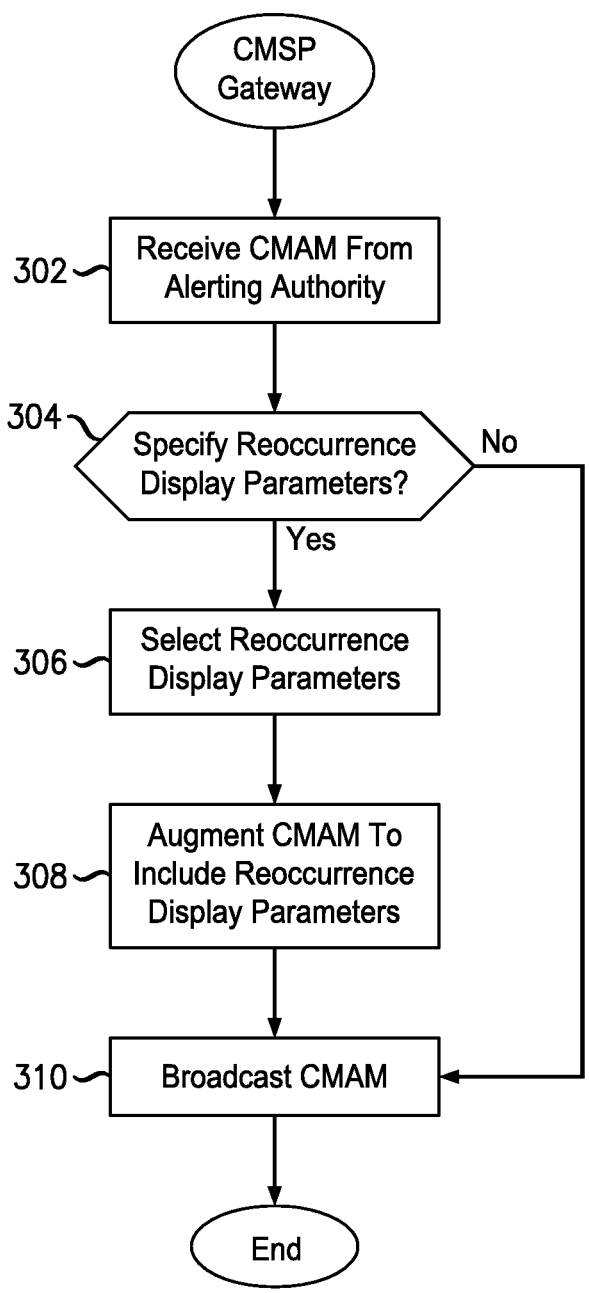
FIG. 3 is a flowchart showing steps performed by a CMSP Gateway to specify CMAM reoccurrence display parameters for targeted mobile devices according to embodiments of the present invention.

To address this problem, embodiments of the present invention are directed to provide for targeted mobile devices to display reoccurrent mobile alerts without relying on repetitive rebroadcasts from the RNC/BNCs. In one embodiment, this is accomplished by new parameters in the commercial mobile alert message (e.g., without limitation, a WRITE-REPLACE message), delivered by a CMSP to one or more RNC/BNCs and passed to targeted mobile devices. In one embodiment, the new parameters will allow the government agency (or any valid agency who initiates the commercial mobile alert message) to force reoccurrence of public safety alerts or other agency alerts and specify the number of reoccurrences to be displayed by the mobile devices and the reoccurrence period Turning now to FIG. 3, there is a flowchart of steps performed by a CMSP Gateway 110 to specify CMAM reoccurrence display parameters for targeted mobile devices according to embodiments of the present invention.

The CMSP gateway 110 is generally defined as any hardware device, server, platform, system, application or function, logically connected to the Government Alerting Network 102 and nominally operated by a CMSP, that is operable to receive, format and broadcast alerts to targeted mobile devices 114 according to current practices and standards such as described in relation to FIG. 2 and further, according to embodiments of the present invention to specify reoccurrence display parameters to the targeted mobile devices.

The logical hardware configuration (not shown) of the CMSP gateway 110 includes a processor and memory, an input interface (logically connected to reference point "C") and an output interface (logically connected to reference point "D"). The steps of FIG. 3 may be performed, for example and without limitation, by the processor executing program code (e.g., including but not limited to operating system firmware/software and application software) stored in the memory.

At step 302, the CMSP gateway 110 receives a CMAM from an alerting authority (e.g., government agency or other valid agency) via the input interface. Coincident to receiving the CMAM, the CMSP may perform validation and acknowledgement of the CMAM, and geo-targeting to identify a targeted set of cell sites/paging tranceivers for broadcast of the CMA, consistent with current practices and standards. For convenience, steps of validation, acknowledgement and geo-targeting are omitted from FIG. 3.

At step 304, the CMSP gateway determines whether it will specify any reoccurrence display parameters associated with the received CMAM. For example, it is contemplated that the CMSP may specify reoccurrence parameters for some but not all CMAMs received from an alerting authority. If no reoccurrence display parameters are to be specified for a particular CMAM, the CMSP gateway at step 310 broadcasts the CMAM to targeted mobile devices according to current practices and standards, i.e., without reoccurrence display parameters.

If reoccurrence display parameters are to be specified for a particular CMAM, the CMSP gateway selects reoccurrence display parameters at step 306 that are to be associated with the CMAM. In one embodiment, the CMSP gateway 110 selects one or more of the following reoccurrence display parameters at step 306:

Reoccurrence: mandatory or optional. Mandatory reoccurrence indicates that targeted mobile devices must display a designated alert message multiple times. Optional reoccurrence indicates that reoccurrence parameters may be suppressed by the targeted mobile devices.

Number minimum number of times an alerting message should be displayed at a targeted mobile device. For example and without limitation, a government agency may request a targeted mobile device to display a hurricane warning message no less than 3 times.

Display interval: maximum time interval (e.g., in seconds) between consecutive displays of a reoccurrent message. For example and without limitation, a government agency may request a targeted mobile device to display a terrorist warning message multiple times with a time interval of no greater than 60 seconds between consecutive displays.

Compliance interval: minimum whole time period (e.g., in hours) under which reoccurrent message displays should be executed by a targeted mobile device. For example and without limitation, a government agency may request a targeted mobile device to display reoccurring earthquake warning messages for at least 8 hours.

At step 308, having selected one or more reoccurrence display parameters associated with a received CMAM, the CMSP gateway augments the received CMAM message with indicia of the selected reoccurrence display parameters, yielding an augmented CMAM. For example and without limitation, the augmented CMAM may comprise an amended, appended or proxy CMAM that includes the message content of the original CMAM but which further includes indicia of reoccurrence display parameters not present in the originally received CMAM. Alternatively or additionally, the step of augmenting the CMAM at step 308 may involve composing a counterpart message associated with the CMAM that includes indicia of the reoccurrence display parameters.

Finally, at step 310, the CMSP gateway broadcasts the augmented CMAM to targeted mobile devices according to embodiments of the present invention, i.e., for display in compliance with the specified reoccurrence display parameters.

Figure 4:
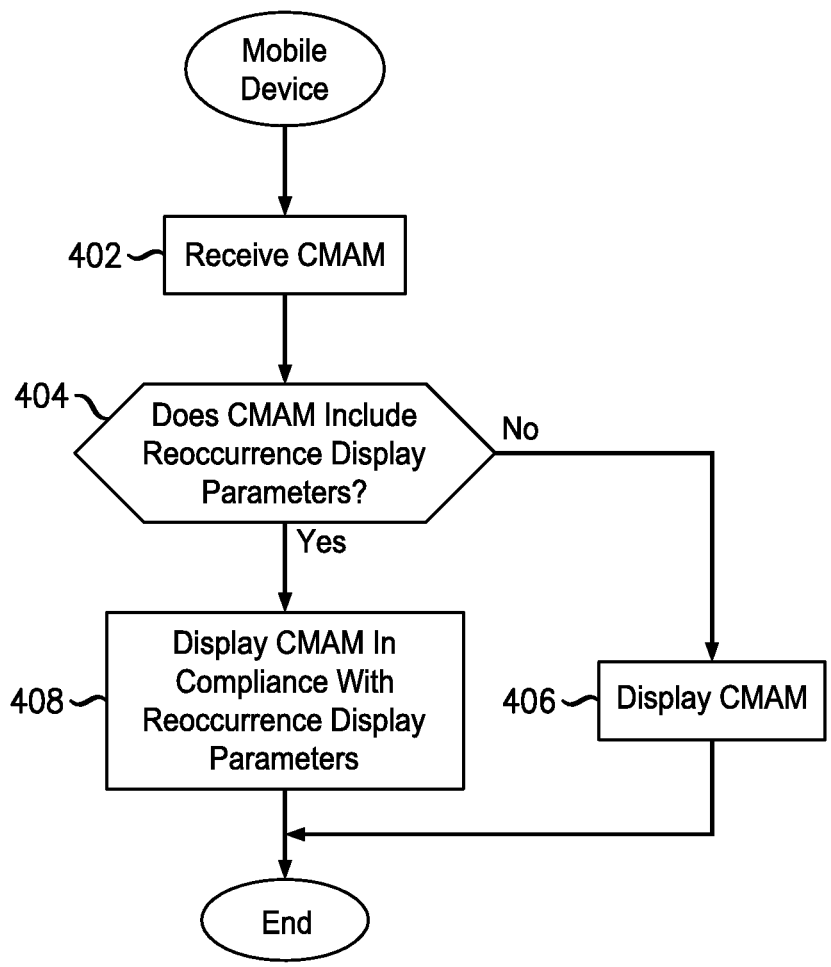
FIG. 4 is a flowchart showing steps performed by a mobile device to execute specified CMAM reoccurrence display parameters according to embodiments of the present invention.

Now turning to FIG. 4, there is a flowchart of steps performed by a mobile device 114 to process received CMAMs according to embodiments of the present invention. The mobile device 114 may comprise, for example and without limitation, a cell phone, personal digital assistant (PDA) or any mobile computing device that is subject to receive and display CMAMs, among other content, generated or forwarded from the CMSP gateway 110.

The mobile device 114 is logically connected to the CMSP gateway by wireless resources, comprising, for example, cell sites/paging transceivers 112 (e.g., depending on delivery protocol, radio network controllers (RNCs) or base station controllers (BSCs)). The wireless resources may implement air interface technologies including but not limited to, CDMA, TDMA, GSM, UMTS or IEEE 802.11.

The logical hardware configuration (not shown) of the mobile device 114 includes a processor and memory, a network interface (logically connected to reference point "E") and a user interface. The user interface may comprise, for example and without limitation, a text display, video display and/or an audio speaker. The steps of FIG. 4 may be performed, for example and without limitation, by the processor executing program code (e.g., including but not limited to operating system firmware/software and application software) stored in the memory.

At step 402, the mobile device receives a CMAM (e.g., an augmented CMAM (with reoccurrence display parameters) or "standard" CMAM (without reoccurrence display parameters)) forwarded from the CMSP gateway 110 via the network interface.

At step 404, the mobile device processes or inspects the CMAM for the presence of reoccurrence display parameters. If the CMAM does not specify any reoccurrence display parameters, the mobile device at step 406 displays the CMAM according to current practices and standards, i.e., without reoccurrence display.

If the CMAM specifies any reoccurrence display parameters, the mobile device at step 408 displays the CMAM in compliance with the specified reoccurrence display parameters.

For example and without limitation:

If the CMAM specifies a mandatory reoccurrence display, the mobile device must display the CMAM a designated number of times, display interval or compliance interval as specified in the received CMAM. If the CMAM specifies an optional reoccurrence display, the mobile device may allow the user to suppress the CMAM display (e.g., after the user takes an affirmative action to do so). It is contemplated that an optional reoccurrence display may be implemented in part with a specified mandatory minimum number. For example, the mobile device may allow the user to suppress further reoccurrent displays of a CMAM after displaying the CMAM at least 2 times.

If the CMAM specifies a parameter for minimum number of reoccurrence displays with value X, the mobile device shall display the received CMAM at least X times.

If the CMAM specifies a parameter for maximum interval between reoccurrent displays with value Y, the mobile device shall support display of the received CMAM with no greater time interval than Y (e.g., Y seconds) between consecutive displays.

If the CMAM specifies a parameter for minimum whole time period for reoccurrence displays with value Z, the mobile device shall execute reoccurrent displays of the received CMAM for at least the time interval Z (e.g., Z hours).

If the mobile device receives a command to replace a previous CMAM, or to replace a reoccurrence display parameter associated with a CMAM, the mobile device should discontinue the display of the previous CMAM and ignore all previous reoccurrence display parameters (including stop all relevant timers associated with previous reoccurrence display parameters) and begin to execute the new parameter(s).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

For example, embodiments are described herein with reference to emergency and/or public safety alerts promulgated by a government alerting authority. However, it is to be appreciated that embodiments of the present invention, while applicable to emergency and/or public safety alert messages, are not so limited. Rather, embodiments of the present invention are generally applicable to the communication of any message type or format, originating from any messaging authority. For example and without limitation, embodiments of the present invention may be applied toward the distribution of weather alerts, news or sports messages or advertising.

Thus, the term "commercial mobile alert system" as used herein may apply generally to any communication topology that utilizes a commercial mobile service provider gateway node for promulgating messages to targeted mobile devices served by a commercial mobile service provider; and the term "commercial mobile alert message" or CMAM may apply generally to any message delivered to a CMSP by an alerting authority for distribution to targeted mobile devices.

What is claimed is:

1. In a commercial mobile alert system including a gateway node controlled by a commercial mobile service provider (CMSP), defining a CMSP gateway node, the CMSP gateway node logically connected to an alerting authority that promulgates commercial mobile alert messages (CMAM) for distribution within the commercial mobile alert system, a method comprising the CMSP gateway node:
   receiving a CMAM from an alerting authority;
   selecting one or more reoccurrence display parameters not present in the received CMAM adapted to invoke multiple reoccurrent displays of the CMAM by targeted mobile devices;
   augmenting the CMAM with indicia of the selected reoccurrence display parameters, yielding an augmented CMAM; and
   delivering the augmented CMAM to the targeted mobile devices.

2. The method of claim 1, wherein the step of augmenting the CMAM comprises amending the CMAM to include indicia of the selected reoccurrence display parameters.

3. The method of claim 1, wherein the step of augmenting the CMAM comprises appending the CMAM with indicia of the selected reoccurrence display parameters.

4. The method of claim 1, wherein the step of augmenting the CMAM comprises forming a counterpart message including indicia of the selected reoccurrence display parameters, and wherein the step of delivering the augmented CMAM comprises delivering the CMAM and the counterpart message to the targeted mobile devices.

5. The method of claim 1, wherein the step of delivering the augmented CMAM comprises sending a WRITE-REPLACE message to the targeted mobile devices.

6. The method of claim 1, wherein the reoccurrence display parameters are selected from the group consisting of:
   a mandatory or optional advisory;
   a number of displays condition;
   a time interval between consecutive displays condition; and
   a compliance time interval condition.

7. A commercial mobile service provider (CMSP) gateway node, in accordance with a commercial mobile alert system including an alerting authority logically connected to the CMSP gateway node, the alerting authority adapted to promulgate commercial mobile alert messages (CMAM) for distribution within the commercial mobile alert system, the CMSP gateway node comprising:
   an input interface;
   an output interface;
   a memory; and
   at least one processor operably coupled to the input interface, output interface and memory and configured to:
   (a) receive a CMAM from an alerting authority;
   (b) select one or more reoccurrence display parameters not present in the received CMAM adapted to invoke multiple reoccurrent displays of the CMAM by targeted mobile devices;
   (c) augment the CMAM with indicia of the reoccurrence display parameters, yielding an augmented CMAM; and
   (d) deliver the augmented CMAM to the targeted mobile devices.

8. The CMSP gateway node of claim 7, wherein the processor at part (d) is configured to send a WRITE-REPLACE message to the targeted mobile devices.

9. The CMSP gateway node of claim 7, wherein the processor at part (b) is configured to specify reoccurrence display parameters selected from the group consisting of:
   a mandatory or optional advisory;
   a number of displays condition;
   a time interval between consecutive displays condition; and
   a compliance time interval condition.

10. The CMSP gateway node of claim 7, wherein the processor at part (c) is configured to amend the CMAM to include indicia of the selected reoccurrence display parameters.

11. The CMSP gateway node of claim 7, wherein the processor at part (c) is configured to append the CMAM with indicia of the selected reoccurrence display parameters.

12. The CMSP gateway node of claim 7, wherein
   the processor at part (c) is configured to form a counterpart message including indicia of the selected reoccurrence display parameters, and
   the processor at part (d) is configured to deliver the CMAM and the counterpart message to the targeted mobile devices.

13. A mobile device for displaying commercial mobile alert messages (CMAM), in accordance with a commercial mobile alert system including an alerting authority logically connected to a CMSP gateway node, the alerting authority adapted to promulgate commercial mobile alert messages (CMAM) via the CMSP gateway node for distribution within the commercial mobile alert system, the mobile device comprising:
   a network interface;
   a user interface;
   a memory; and at least one processor operably coupled to the network interface, user interface and memory and configured to:
(a) receive a CMAM and indicia of associated reoccurrence display parameters not present in the received CMAM; and
(b) display the CMAM in compliance with the reoccurrence display parameters.

14. The mobile device of claim 13, wherein the processor at part (b) is configured to display the CMAM in compliance with reoccurrence display parameters selected from the group consisting of:
a mandatory or optional advisory;
a number of displays condition;
a time interval between consecutive displays condition; and
a compliance time interval condition.

* * * * *